(12) United States Patent
Bowman et al.

(10) Patent No.: US 11,581,764 B2
(45) Date of Patent: Feb. 14, 2023

(54) PERMANENT MAGNET MOTOR

(71) Applicant: MAHLE International GmbH, Stuttgart (DE)

(72) Inventors: Brett Bowman, Lockport, NY (US); Jonathan Hammond, Churchville, NY (US)

(73) Assignee: MAHLE International GmbH, Stuttgart (DE)

( * ) Notice: Subject to any disclaimer, the term of this patent is extended or adjusted under 35 U.S.C. 154(b) by 95 days.

(21) Appl. No.: 17/134,816

(22) Filed: Dec. 28, 2020

(65) Prior Publication Data

US 2022/0209596 A1    Jun. 30, 2022

(51) Int. Cl.
| | |
|---|---|
| H02K 7/04 | (2006.01) |
| H02K 1/27 | (2022.01) |
| H02K 1/28 | (2006.01) |
| H02K 5/15 | (2006.01) |
| H02K 15/02 | (2006.01) |
| H02K 15/16 | (2006.01) |

(52) U.S. Cl.
CPC ............... *H02K 1/27* (2013.01); *H02K 1/28* (2013.01); *H02K 5/15* (2013.01); *H02K 7/04* (2013.01); *H02K 15/02* (2013.01); *H02K 15/165* (2013.01)

(58) Field of Classification Search
CPC .. H02K 5/15; H02K 5/04; H02K 5/24; H02K 15/16; H02K 1/27; H02K 5/02; H02K 7/04; H02K 15/02; H02K 15/165; H02K 15/14; F25B 31/02; F25B 31/023; F25B 31/026

USPC .............. 310/49.12, 50, 216.114, 216.117
See application file for complete search history.

(56) References Cited

U.S. PATENT DOCUMENTS

| | | | | |
|---|---|---|---|---|
| 7,435,067 | B2 * | 10/2008 | Doepker | F04C 18/0215 |
| | | | | 417/410.5 |
| 2002/0140309 | A1 | 10/2002 | Yanashima et al. | |
| 2006/0133944 | A1 | 6/2006 | Doepker et al. | |
| 2017/0179802 | A1 * | 6/2017 | Fujisue | F25B 31/026 |
| 2018/0358846 | A1 * | 12/2018 | Baba | C22C 38/02 |

FOREIGN PATENT DOCUMENTS

| | | |
|---|---|---|
| CN | 209562266 U | 10/2019 |
| JP | 2-46142 A | 2/1990 |
| KR | 20000039322 A * | 7/2000 |

OTHER PUBLICATIONS

Machine Translation of KR 20000039322 A (Year: 2000).*

* cited by examiner

*Primary Examiner* — Quyen P Leung
*Assistant Examiner* — Christopher S Leone
(74) *Attorney, Agent, or Firm* — Dickinson Wright PLLC

(57) ABSTRACT

A rotor assembly for a permanent magnet motor includes a rotor stack of laminated ferromagnetic layers and partial end plates at opposite axial ends of the rotor stack wherein each axial end of the rotor bears two partial end plates, each of which covers a partial circle and does not axially overlap with the other one of the partial end plates at the same axial end. The two partial end plates of each axial end are formed by a first axial end plate shaped as a first partial ring disc and a second partial end plate shaped as a second partial ring disc that are made of stamped metal and that are of different mass.

12 Claims, 2 Drawing Sheets

PERMANENT MAGNET MOTOR

TECHNICAL FIELD

The present disclosure relates to a permanent magnet motor. In particular, this disclosure relates to a brushless permanent magnet motor of a scroll machine, such as a compressor for an automotive HVAC system.

BACKGROUND

The rotors of compressors with rigid rotors, i.e. rotors operated at a rotational speed well below their specific natural frequency, are generally provided counterweights for balancing the moving parts of a compressor mechanism. This is a measure to reduce vibrations and stress caused by unbalance. The counterweights may be attached to the rotor itself or to the shaft driven by the rotor. One example for the use of a brushless permanent magnet motor with a rotor balanced with counterweights is a scroll compressor in an HVAC system of an electric or hybrid vehicle.

The rotor of a brushless motor may be composed of a stack of ferromagnetic sheets alternating with insulating layers. Permanent magnets may be inserted in slots formed in the stack. Typically, the stack is held together by non-ferrous end plates secured by fastening pins that extend through the end plates and the stack from end to end in an axial direction. The unbalance of a compressor mechanism depends on the overall geometry of the rotor assembly including all parts rotating with the shaft, for example, an orbiting scroll.

While counterweights are thus necessary for balancing the moving parts of a compressor mechanism, they also occupy valuable packaging space, especially in automotive vehicles where packaging space is very limited.

SUMMARY

It is therefore desirable to produce rotors for brushless electric motors that allow for proper balancing of the compressor mechanism while taking up little volume.

This is achieved by divided end plates at the axial ends of the rotor, where each axial end of the rotor bears two complementary partial end plates, each of which covers a partial circle of the end surface and does not axially overlap with the other one of the partial end plates.

These end plates may be made of non-ferrous materials of different density so that plates, even if they were made in the same shape and volume, would still have a different mass. Thus, the end plates themselves constitute the counterweights without requiring extra space. For example, a first partial end plate may be made of aluminum or a lightweight aluminum alloy, and the second partial end plate may be made of brass or another high-density non-ferrous metal, including another non-ferrous alloy.

Alternatively or additionally, the first and second partial end plates may have different axial thicknesses such that the thicker one of the partial end plates has a greater mass than the thinner one of the complementary partial end plates.

The two complementary partial end plates may cover identical angular ranges around the shaft so that gaps between the two partial end plates are found on opposite sides of the shaft, offset from each other by 180 degrees. Alternatively, however, the angular range of the first partial end plate may differ from the angular range covered by the second partial end plate so that the gaps between the end plates are offset from each other by an angle other than 180 degrees, for example dividing the 360-degree circle into sections of about 180 degrees plus/minus 5 degrees for the first partial end plate and about 160 degrees for the second partial end plate (where the gaps between the end plates may amount to about 10 degrees each) for the respective first and second end plates. In these angular ranges the gap width between the partial end plates decreases the angular range of either or both of the partial end plates so that the total combined angular range of the two partial end plates amounts to less than 360 degrees. Also, extending the partial end plate of higher mass significantly beyond 180 degrees (e.g. by more than 10 degrees) would result in the mass in one end section of the partial end plate canceling out the mass in the opposite end section of the partial end plate, while unnecessarily increasing the rotational inertia of the rotor. Accordingly, the higher-mass partial end plate is preferably limited to occupying a range of at most 180 degrees.

Additionally or alternatively, one or both of the partial end plates on one axial side or on both axial sides of the rotor may be machined for fine-tuning the balance of the rotor assembly.

Using partial end plates to serve as counterweights provides not only for a space-saving alternative to counterweights added to the assembled rotor or shaft it also and allows for cost-saving stamping of the partial end plates, including any holes for the axial pins.

Further details and benefits will become apparent from the following description of examples shown in the appended drawings. The drawings are provided herewith for purely illustrative purposes and are not intended to limit the scope of the present invention.

DETAILED DESCRIPTION OF THE DRAWINGS

Figure 1:
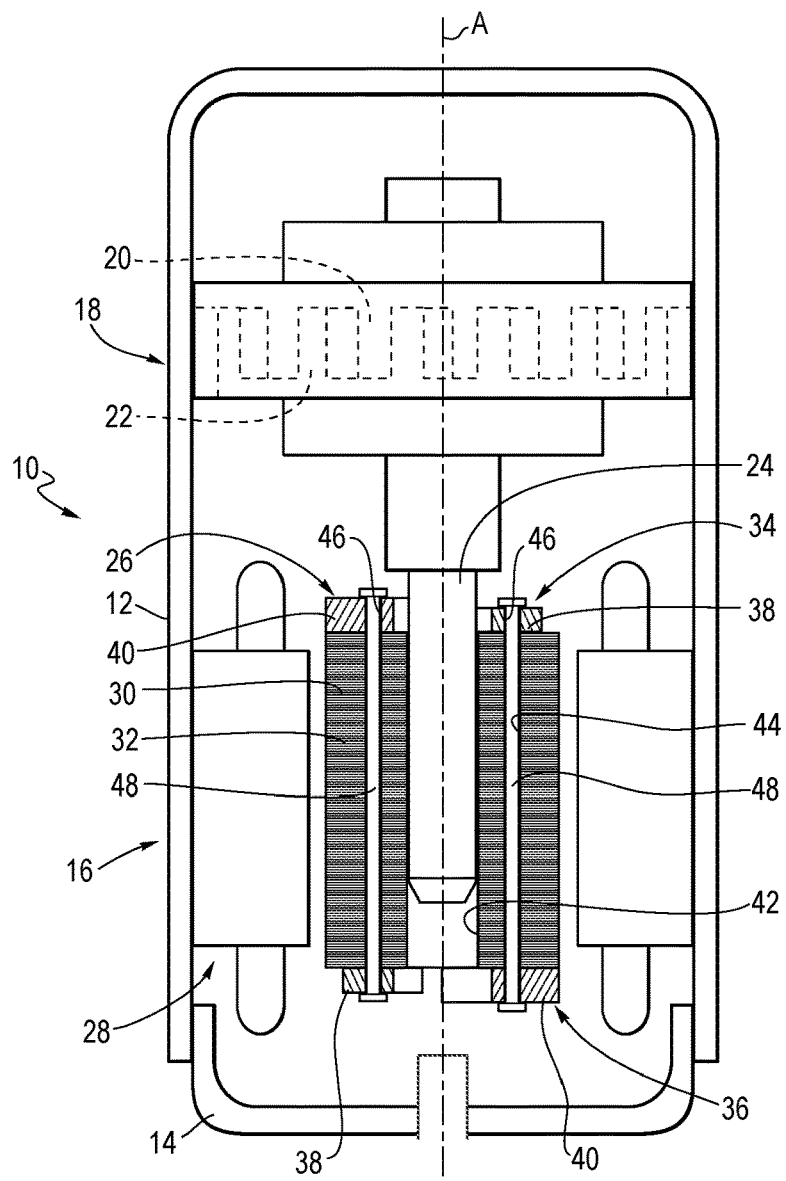
FIG. 1 shows a schematic cross-sectional view of a scroll compressor implementing a rotor with counterweights according to the present disclosure.

FIG. 1 shows a scroll compressor 10 comprises a generally cylindrical housing 12 and a lid 14 hermetically sealing off the housing 12. As scroll compressors are generally known in the art, only those elements are shown that bear relevance for the present disclosure, leaving out any ports, connectors, conduits and bearings. The housing 12 of the scroll compressor 10 accommodates a motor 16 and a scroll assembly 18 composed of a fixed scroll member 20 that remains stationary with respect to the housing 12 and an orbiting scroll 22 driven by an eccentric shaft end of a shaft 24. As generally known, each of the fixed scroll member and the orbiting scroll bears a wrap forming an involute spiral with constant spacing between volutions, wherein the spacing defines the eccentricity circle of the shaft 24. The wraps of the orbiting scroll member mesh with the wraps of the fixed scroll member 20 and form two cavities between them. The shaft 24 is fixedly coupled to and rotated by a rotor 26 of the motor 16. The rotor 26 is driven by a stator 28 surrounding the rotor 26 and affixed to the housing.

The rotor 26 includes rotor stack 30 formed of a plurality of rotor laminations 32 and a plurality of permanent magnets (outside of the image plane). The rotor 26 further comprises an upper counterweight arrangement 34 and a lower counterweight arrangement 36 attached to opposite axial ends of the for static balancing of the rotor 26. The upper and lower counterweight arrangements 34 and 36 are originally composed of similar parts with each of the counterweight arrangements 34 and 36 including a lightweight partial end plate 38 and a heavyweight partial end plate 40, which is heavier than the lightweight partial end plate 38. The lightweight partial end plates 38 are offset from each other by 180 degrees around the rotational axis A, while the heavyweight partial end plates 40 may be offset from each other by a few degrees to account for both static and dynamic balancing of the rotating parts. Further details are shown in FIGS. 3 and 4, discussed below.

The rotor laminations 32 define a central shaft bore 42, a plurality of magnet slots (outside the image plane) and a plurality of pin holes 44. The upper and lower counterweight arrangements 34 and 36 have fastening holes 46 aligned with the pin holes 44. A respective fastening pin 48 extends through each of the pin holes 44 and the fastening holes 46 of the upper and lower counterweight arrangements 34 and 36 aligned with the respective pin hole 44.

Figure 2:
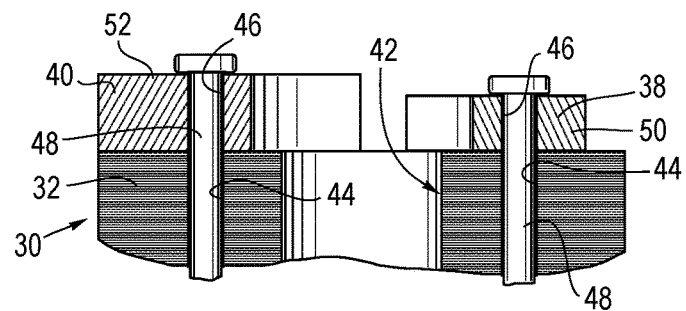
FIG. 2 shows a partial detail view of the rotor of FIG. 1 with counterweights according to the present disclosure.
Figure 3:
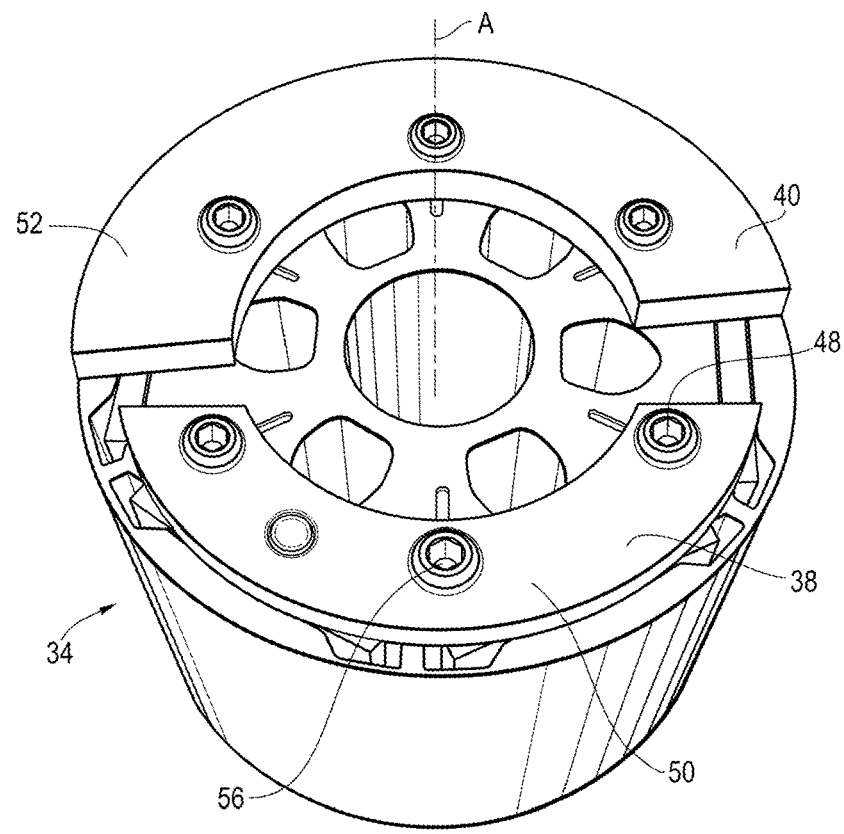
FIG. 3 shows a first perspective view of the rotor of FIGS. 1 and 2.
Figure 4:
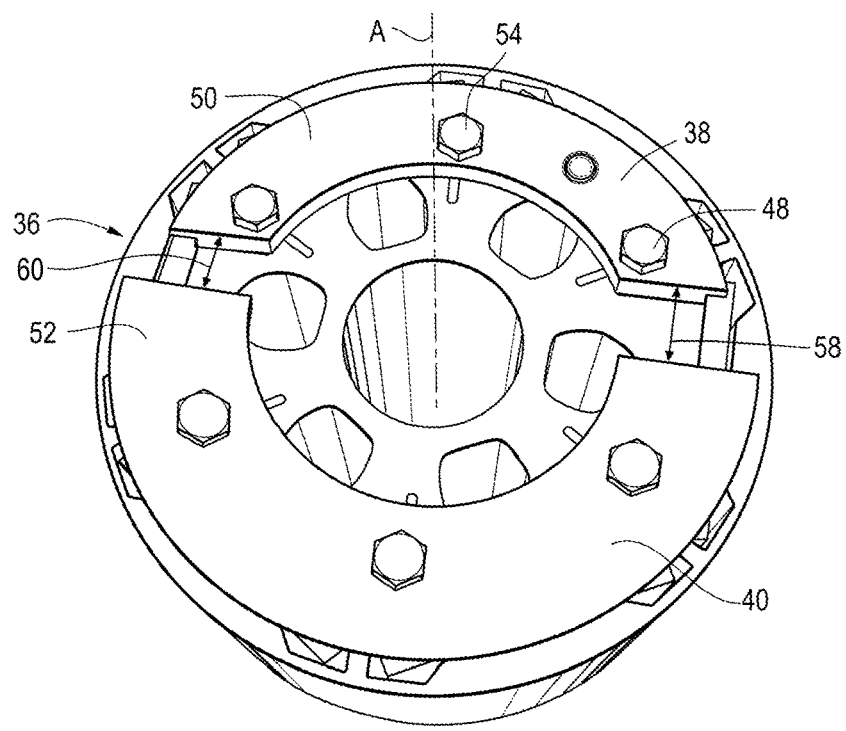
FIG. 4 shows a second perspective view of the rotor of the preceding drawing figures.

While FIG. 2 only shows a schematic cross-section of an upper portion of the rotor 26, including only the upper counterweight arrangement 34, FIGS. 3 and 4 show the rotor 26 from opposite sides. FIG. 3 shows the upper counterweight arrangement 34, and FIG. 4 shows the lower counterweight arrangement 36.

Although the counterweight arrangement 34 shown in FIGS. 2 and 3 is only the upper counterweight arrangement 34, the description referring to FIGS. 2 and 3 applies, by analogy, also to the lower counterweight arrangement 36 shown in FIG. 4.

The counterweight arrangement 34 is composed of two partial ring discs 50 and 52. A first partial ring disc 50 is smaller both in it axial thickness and in its radial width than the second partial ring disc 52. The first partial ring disc 50 forms a lightweight partial end plate 38, while the second partial ring disc 52 forms a heavyweight partial end plate 40.

In the example shown, the first partial ring disc 50 consists of aluminum or a lightweight aluminum alloy. In contrast, the second partial ring disc 52 consists of brass or another heavyweight metal or alloy. As a general rule, neither material of the partial ring discs has any ferromagnetic properties.

In examples like this, where the partial end plates 38 and 40 consist of materials of different density, it may be possible to balance the rotating compressor mechanism with partial end discs of identical size, shape, and volume by selecting appropriate materials. It is, however more feasible for series production to consistently use a first predetermined material for the lightweight partial end plate 38 and another predetermined material for the heavyweight partial end plate 40. As the geometrical dimensions of the rotor assembly are known, the heavyweight partial end plates 40 may be premanufactured with a predetermined thickness that adds the required counterweight over the angular range covered by the heavyweight partial end plates 40.

As shown in FIGS. 3 and 4, the lightweight partial end plates 38 cover a lesser angular range than the heavyweight partial end plates 40. Each of the heavyweight partial end plates 40 covers up to half of a circle, i.e. 180 degrees, while the lightweight partial end plates 38 each cover an angular range of 125 to 140 degrees. In the shown example, the gaps 58 and 60 between the partial end plates 38 and 40 do not extend in a strictly radial direction, but are rather arranged to align with each other in a straight line. The direction of the gaps has a minor effect on the mass distribution and inertia of the rotor and can be taken into account in calculations during the design stage. As shown in FIG. 4, the gaps 58 and 60 are of different widths on at least one axial end of the rotor 26 for dynamic balancing so that the centers of gravity of the heavyweight end plates 40 on the opposite axial ends are offset from each other by an angle slightly different than 180 degrees, for example 175 degrees to 179 degrees around the rotational axis A.

The rotor is held together by six fastening pins 48 extending through the pin holes 44 in the rotor stack and the aligned fastening holes 46 in the partial end plates 38 and 40. The number of fastening pins 48 may vary, depending on the number of magnet slots in the rotor for space reasons.

The two complementary partial end plates 38 and 40 may cover identical angular ranges around the shaft so that gaps between the two partial end plates are found on opposite sides of the shaft, offset from each other by 180 degrees. Alternatively, however, the angular range of the lightweight partial end plate 38 may differ from the angular range covered by the heavyweight partial end plate 40 so that the gaps between the partial end plates complementing each other on one of the axial ends of the rotor stack 30 are offset from each other by an angle other than 180 degrees, for example dividing the 360-degree circle into sections of about 180 degrees for the angular range covered by the heavyweight partial end plate and about 160 degrees for the angular range covered by the lightweight partial end plate (where the gaps between the partial end plates may amount to about 10 degrees each). In these angular ranges the gap width between the partial end plates 38 and 40 decreases the angular range of either or both of the partial end plates 38 and 40 so that the total combined angular range of the two partial end plates amounts to less than 360 degrees.

Significantly extending the heavyweight partial end plate 40 beyond 180 degrees would result in the mass at one end of the partial end plate 40 canceling out the mass at the other end of the partial end plate 40, while unnecessarily increasing the rotational inertia of the rotor 26. Accordingly, the heavyweight partial end plate 40 is preferably limited to occupying an angular range of about 180 degrees or less. Variations of the gap width, the thicknesses of the partial end plates and the angular range covered by each of the partial end plates are determined by the overall geometry of the rotating compressor mechanism, keeping in mind inertia, space requirements, and overall mass.

As can be seen in FIG. 4, each of the fastening pins 48 has an enlarged head 54 abutting the axial end surface of the partial end plates 38 and 40. Each of the fastening pins 48 extends through one of the partial end plates 38 and 40, through the rotor stack, and through another one of the partial end plates 38 and 40. Generally, each of the fastening pins extends through one lightweight partial end plate 38 on one side and through a heavyweight partial end plate 40 on the opposite side. At the end 56 opposite from the enlarged head 54, each of the fastening pins 48 is riveted to secure the partial end plates 38 and 40 to the rotor stack 30 as shown in FIG. 3.

In a variation of the shown configuration, the heavyweight partial end plates 40 on each axial end of the rotor 26 may be composed of two or more stacked layers of stamped plates, thereby allowing for a modular approach. The stacked layers of the partial end plates composed in this manner may be made of different or identical materials.

While the above description constitutes the preferred embodiments of the present invention, the invention is susceptible to modification, variation and change without dep

What is claimed is:

1. A rotor assembly for a permanent magnet motor, the rotor assembly comprising:
    a rotor stack of laminated ferromagnetic layers and
    end plates at opposite axial ends of the rotor stack
    wherein each axial end of the rotor bears two partial end plates, each of which covers a partial circle and does not axially overlap with the other one of the partial end plates at the same axial end;
    wherein the two partial end plates of each axial end are of different mass;
    wherein at least one of the following is present:
        the two partial end plates at the same one of the two axial ends are made of different materials, such that the material of one of the two partial end plates has a higher density than the material of the other partial end plate; or
        each of the two partial end plates at the same one of the two axial ends covers a respective angular range, wherein the two respective angular ranges differ from one another.

2. The rotor of claim 1, wherein the two partial end plates of each axial end are formed by a first axial end plate shaped as a first partial ring disc and a second partial end plate shaped as a second partial ring disc.

3. The rotor of claim 2, wherein the first and second partial ring discs are made of stamped metal.

4. The rotor of claim 1, wherein the material of one of the two partial end plates contains copper and the material of the other partial end plate contains aluminum.

5. The rotor of claim 1, wherein the two partial end plates at the same one of the two axial ends have different axial thicknesses.

6. The rotor of claim 1, wherein the one partial end plate of greater mass than the other partial end plate extends over a greater angular range than the other partial end plate of lesser mass.

7. The rotor of claim 6, wherein the greater angular range is at most 180 degrees.

8. The rotor of claim 1, further comprising a plurality of fastening pins, each of the fastening pins extending through the rotor stack in an axial direction and, at each axial end, through exactly one of the two partial end plates.

9. The rotor of claim 1, further comprising a plurality of fastening pins, each of the fastening pins extending through the rotor stack in an axial direction and, at each axial end, through fewer than all of the partial end plates located at the axial end.

10. A permanent magnet motor comprising a rotor according to claim 1.

11. The permanent magnet motor of claim 10, further comprising a motor stator, wherein the permanent magnet motor is a brushless induction motor.

12. An electrically driven scroll compressor comprising a permanent magnet motor according to claim 10.

* * * * *